United States Patent Office 3,343,944
Patented Sept. 26, 1967

3,343,944
ELECTROLYTIC BERYLLIUM GRANULES AND
METHOD FOR MANUFACTURING SAME
Jean-Marie Logerot and René Molinier, Chambéry,
France, assignors to Pechiney, Compagnie de Produits
Chimiques et Electrometallurgiques, Paris, France
No Drawing. Filed Sept. 1, 1964, Ser. No. 393,758
Claims priority, application France, Sept. 6, 1963,
946,882
2 Claims. (Cl. 75—0.5)

This invention relates to the production of granules or platelets of beryllium and to a method for producing same and relates more particularly to electrolytic beryllium platelets or granules of spherical shape and to the method of producing same.

Beryllium has been produced as granules or platelets of 98 to 99% purity by the electrolysis of beryllium chloride with sodium chloride or with a mixture of alkali metal chlorides such as solutions of sodium and potassium chlorides with or without an added organic liquor. The beryllium chloride has been obtained by chlorination of beryllium hydroxide in the presence of carbon and it has been purified by sublimation and fractional condensation.

The impurities consist chiefly of electrolyte and impurities originally contained in the beryllium ore.

To the present, most metallurgical uses require a beryllium having a higher degree of purity and particularly a beryllium having a halogen content which does not exceed 100 to 150 parts per million.

In a process which is known to the present, the granules of beryllium are reduced to a molten state under vacuum and then cast into ingots from which the slags or crusts are removed before the ingot is reduced to fine shapes and pulverized.

The method or procedure is subject to a number of disadvantages in that it constitutes a tricky process; it is an expensive procedure, and it produces granules of a regular shape instead of a spheroidal shape of the type deemed to be most advantageous. Further, degassing, while in the state of fusion, constitutes a tedious and long process with only mediocre and inconsistent results.

Thus, it is an object of this invention to produce and to provide a simple and economical method for producing beryllium granules or platelets which have a relatively high degree of purity, which are secured in spheroidal shape, and which have a low halogen content.

In accordance with the practice of this invention, granules or platelets of beryllium produced, as by the electrolytic process, are further processed at a temperature within the range of 1500 to 1800 degrees C., in an inert atmosphere, and under a pressure within the range of 0.1 to 0.9 atmosphere, and preferably in a vertical furnace.

In a following description, reference will be made to the granular dimensions of the beryllium particles, as measured in accordance with the following screen sizes.

Screen designation:     Dimension of openings in mm.
    T 50 _____ 0.297
    T 110 _____ 0.149
    T 150 _____ 0.105
    T 200 _____ 0.074
    T 250 _____ 0.062
    T 300 _____ 0.053
    T 350 _____ 0.044

In the following examples, which are given by way of illustration of the practice of this invention and not by way of limitation, use is made of a vertical furnace having a resistor of graphite provided with an automatic regulator for maintaining the temperature at about 1650° C. The furnace is fitted with a tube of calcined beryllia and an inert atmosphere is maintained in the furnace by circulation of an inert gas such as argon. The pressure is maintained at about 0.3 atmosphere.

Two batches of beryllium granules are used, having the following screen analysis:

| Screen Size | Percent by Weight Retained on the Screen | |
|---|---|---|
| | Batch A | Batch B |
| T 110 | (¹) | (¹) |
| T 150 | 77 | 37 |
| T 200 | 99 | 45 |
| T 250 | | 79 |
| T 300 | | 87 |
| T 350 | | 99 |

¹ A trace.

The following are the chief impurities in the original granules analyzed after washing and pulverizing:

P.p.m.
Chlorine _____ 200–300
Iron _____ 300–400

Passage through the high temperature zone of the furnace occurs at a rate to provide exposure for a time sufficient to reduce the fine granules to a molten state.

Each batch, A and B, is separately passed successively through the hot zone of the furnace through an oscillating T 50 screen. As the particles fall through the hot zone of the furnace, liberation of a gas is observed which operates to impair visibility of the surrounding area but which is insufficient to cause an noticeable rise in pressure, as indicated by a manometer communicating with the hot zone of the furnace. The particles passing through the hot zone, collect at the bottom of the furnace. After cooling, the lower portion of the furnace is carefully opened and the beryllium powders are removed.

Some agglomerates were formed by coalescence of the fine particles. After sieving through a T 50 screen, the product was observed to contain a large proportion of spheroidal granules. The product gave the following screen analysis.

| Screen Size | Percent by Weight Residue Retained on the Screen | |
|---|---|---|
| | Batch A | Batch B |
| T 50 | 30 | 13 |
| T 110 | 55 | 41 |
| T 200 | 100 | 77 |
| T 350 | | 100 |

It will be observed that an appreciable enlargement of the particles was obtained by the heat treatment in both of the batches A and B and especially in Batch A which originally was also coarser. The higher yield of 60% passage through the T 110 screen was obtained with Batch B.

Chemical analysis of the granules before and after heat treatment, in accordance with the practice of this invention was as follows:

| Batch | Screen | Heat Treatment | Iron, p.p.m. | Cl, p.p.m. |
|---|---|---|---|---|
| A | 100–200 | Before | 490 | 300 |
|   | 50–110 | After | 440 | <20 |
|   | 110–200 | ___do___ | 390 | 30 |
| B | 110–350 | Before | 340 | 270 |
|   | 50–110 | After | 340 | 110 |
|   | 110–200 | ___do___ | 340 | <20 |
|   | 200–350 | ___do___ | 390 | 30 |

Material reduction in chlorine content is secured in both of the batches as a result of the described heat treatment. However, the coarser portions of the granules of Batch A are not completely dechlorinated, perhaps because of insufficient or imperfect fusion. The portions embodying the finer grain size have a slightly higher chlorine content which may have been influenced by the presence of other impurities such as beryllium oxide.

Melting of the particles of beryllium during passage through the high temperature zone of the furnace, under the conditions described, makes it possible to produce beryllium powders or granules of spheroidal shape as well as of controlled size distribution while effectively degassing the powders to remove chlorine or other halogen substantially independently of the original chlorine content.

It will be apparent that the process described can be carried out with inexpensive and readily available equipment since it is not necessary, in accordance with the practice of the invention, to maintain high vacuum conditions during heat treatment and dechlorination.

It will be understood that invention exists not only in the process for treatment but also in the new and improved beryllium product that is secured.

It will be understood that changes may be made in the details of processing conditions and materials without departing from the spirit of the invention, especially as defined in the following claims.

What is claimed is:

1. In the method of producing finely divided purified particles of beryllium of spheroidal shape having a halogen content of less than 150 p.p.m., the steps of providing a vertically disposed furnace, heating the furnace to a temperature within the range of 1500–1800° C., maintaining an inert atmosphere within said furnace, drawing a sub-atmospheric pressure within the furnace within the range of 0.1 to 0.9 atmosphere, and feeding beryllium particles of a particle size less than 0.149 mm. in separated relationship in the upper end of the furnace for continuous passage gravitationally downwardly through the furnace for exposure to heat for a length of time to reduce the particles to their molten state whereby the separated particles form to spheroidal shape while halogens are withdrawn in response to the exposure of the large surface area of the molten particles to the sub-atmospheric conditions while in their separated molten state to produce purified spheroidal particles of beryllium.

2. The method as claimed in claim 1 in which the beryllium particles originally contained in excess of 300 p.p.m. of halogen.

References Cited

UNITED STATES PATENTS 2,889,874   6/1959   Gauvin _____ 75—.5

FOREIGN PATENTS 415,456   8/1934   Great Britain.

OTHER REFERENCES

Goetzel, C. G.: Treatise on Powder Metallurgy, vol. II, pp. 741–742.

DAVID L. RECK, *Primary Examiner.*

HYLAND BIZOT, *Examiner.*

W. W. STALLARD, *Assistant Examiner.*